Dec. 27, 1938.  W. C. HAYMAN  2,141,910
ELECTRIC CABLE
Filed March 19, 1935
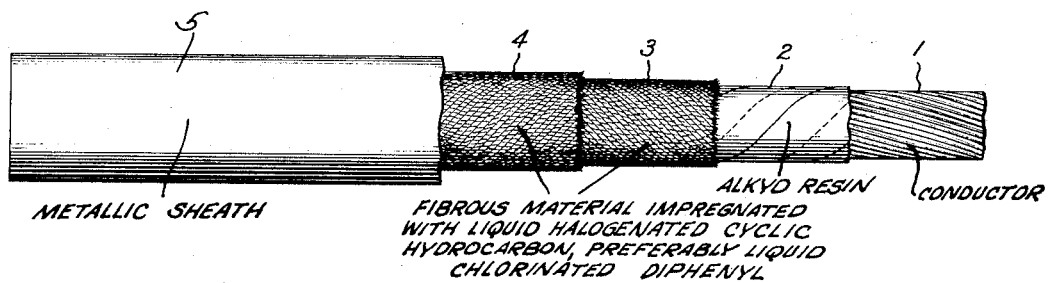
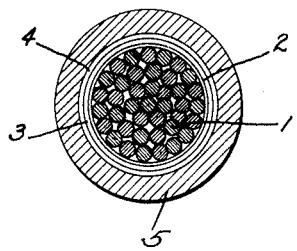
Inventor:
William C. Hayman
by Harry E. Dunham
His Attorney.

Patented Dec. 27, 1938

2,141,910

UNITED STATES PATENT OFFICE 2,141,910

ELECTRIC CABLE

William C. Hayman, Schenectady, N. Y., assignor to General Electric Company, a corporation of New York Application March 19, 1935, Serial No. 11,763

2 Claims. (Cl. 173—264)

The present invention relates to electric cables and in particular to cables which are adapted for use in secondary underground network systems operating at low voltages, as 110 volts and 220 volts for example, and heavy currents.

In such systems it is the established practice in order to avoid service interruption to provide electric cables which are so constructed that if a short-circuit or other fault occurs, a resulting arcing will be allowed to persist until the fault has been cleared by the burning away of the cable structure at the fault. The severed ends which are still connected to the network at their remote ends remain in service. If the cable insulation consists wholly or preponderantly of combustible organic material, as for example, paper, cotton, or the like, then combustible gases are evolved by the arcing and the resulting heating of the adjacent cable structure. Dangerous explosions have resulted when sufficient amounts of such gases have become mixed with air and become ignited in a confined space.

In accordance with Clark United States Patent 1,931,373, of October 17, 1933, evolution of explosive gases in an electric cable is avoided by using in such cable a liquid halogenated cyclic compound which has a sufficiently high chlorine content to yield only substantially non-inflammable gases under the conditions above described. Such material may be used in conjunction with paper or other organic insulating material providing the amount of organic material of this type is not sufficiently high to render the proportion of combustible gas in the gaseous mixture high enough to permit explosions or fires to occur.

Although it is practicable in the fabrication of an electric cable to fill the entire space between the conductor and the surrounding sheath with paper which is impregnated with a liquid halogenated compound of this class, or to provide ducts filled with such compound, such constructions are not applicable for every class of service. It has been suggested to provide in the space surrounding the conductor an inorganic insulating material of high porosity, such as asbestos, which may be impregnated with such halogenated compound. However, it has been found that such a material does not have as high a dielectric strength as is desirable for electrical distribution service. To provide sufficient insulation value would entail an increase in the thickness of the insulation layer which would unduly increase the diameter and cost of the cable.

In accordance with my present invention I have provided a composite insulation consisting preponderantly of fire-proof inorganic insulation and a relatively thin layer of organic, plastic insulation of high dielectric strength, thereby greatly increasing the dielectric value of the insulation as a whole without materially adding to its cost, and without sacrificing the fire-proof quality of the insulation.

For the layer of organic insulation I may employ cotton fabric impregnated with flexible, synthetic resin, and for the layer of inorganic insulation I may employ asbestos or similar porous inorganic fibrous material. Such inorganic material is impregnated with chlorinated diphenyl, or similar non-combustible, inert liquid.

In the accompanying drawing, Fig. 1 is a side view partly in section of a length of electric cable and Fig. 2 is a cross-section of such cable embodying my invention.

Referring to the drawing the cable conductor or core 1, ordinarily consists of a bundle of copper wires. Surrounding the conductor 1 is a layer 2 of an organic plastic insulation of high dielectric strength, such, for example as a natural or synthetic resin and preferably an alkyd resin. Other suitable materials may be used as for example, cellulose acetate, or acrylic acid condensation products. A wrapping of cotton tape impregnated with an alkyd resin made by the chemical reaction of phthalic anhydride, glycerine, succinic acid, ethylene glycol, abietic acid, and China-wood oil, may be used. Such a resin is described in U. S. Patent 1,975,569, patented October 2, 1934. This layer 2 which may be lapwound, as indicated, is about 1/64 inch in thickness. The described materials are unaffected by the solvent properties of chlorinated diphenyl compounds.

Superimposed on the layer 2 are two windings 3, 4 of asbestos yarn, or thread, each of which is about the same thickness. Instead of asbestos other forms of inorganic insulation may be used, as for example, spun glass, or mineral wool. Instead of being applied in thread-like form, the mineral layer may be applied as a tape, felt, or other physical form. An external protective sheath 5, made for example of metal, surrounds the whole.

The mineral fibre layers are impregnated with a liquid halogenated cyclic hydrocarbon, as for example, chlorinated diphenyl, chlorinated diphenyl oxide, chlorinated diphenyl methane, chlorinated diphenyl ketone, trichlor benzene, or various liquid mixtures of such compounds. Preferably I employ liquid chlorinated diphenyl containing about 50 to 60 per cent chlorine.

Suitable impregnating compounds of this type are described in the above Clark Patent 1,931,373.

The advantage accruing from the cable insulation structure of my present invention will be apparent from a consideration of the fact that the dielectric strength of the combination of the two unlike insulation layers is about five kilovolts while the dielectric strength of the impregnated asbestos alone (even if of the same total thickness as the total thickness of the asbestos and resin) is only about 1.5 kilovolts.

While in the preferred form of my invention the two types of cable insulation have been shown in combination in a superimposed relation in which the mineral layer is wholly external to the resin-impregnated fabric, I desire by the appended claims to cover also other combinations of such layers. For example, in some cases the resin-impregnated fabric may be sandwiched between two layers of mineral insulation.

What I claim as new and desire to secure by Letters Patent of the United States is:

1. An electric cable which is adapted for use in secondary underground network systems operating at low voltages and heavy currents, said cable consisting of a conductive core, a wrapping about $\frac{1}{64}$ inch thick on said core, said wrapping consisting preponderantly of cellulosic material impregnated with a resin resulting from the reaction of phthalic anhydride, glycerine, succinic acid, ethylene glycol, abietic acid and China-wood oil, a second wrapping of asbestos impregnated with liquid chlorinated diphenyl containing about 50 to 60 per cent chlorine, said combined insulating wrappings having a dielectric strength approximately three times the dielectric strength of the impregnated asbestos alone when the latter is of the same thickness as the total thickness of the said combined wrappings, and an external metallic sheath surrounding the whole.

2. An electric cable which is adapted for use in secondary underground network systems operating at low voltages and heavy currents, said cable consisting of a conductor, a relatively thin mass of organic insulation superposed directly on the conductor, said insulation consisting of cotton fabric impregnated with a flexible alkyd resin, an insulating mass consisting substantially of asbestos impregnated with liquid chlorinated diphenyl compound superposed directly on said organic insulation, said combined insulating masses having a dielectric strength at least three times the dielectric strength of the impregnated asbestos alone when the latter is of the same thickness as the total thickness of the said combined masses, and an external metal sheath surrounding the whole.

WILLIAM C. HAYMAN.